Patented Feb. 7, 1950

2,496,956

UNITED STATES PATENT OFFICE 2,496,956

1-ALKYL-4-(BETA-HYDROXYETHYL-AMINO)-PIPERIDINES

Robert H. Reitsema, Kalamazoo, Mich., assignor to The Upjohn Company, Kalamazoo, Mich., a corporation of Michigan No Drawing. Application April 30, 1948,
Serial No. 24,427

4 Claims. (Cl. 260—293)

1

This invention relates to 1-alkyl-4-(β-hydroxyethylamino)-piperidines, salts thereof, and a method for their preparation.

The compounds of this invention may be represented by the formula:

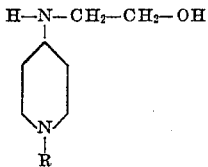

wherein R is a lower-alkyl group containing from 1 to 8 carbon atoms, inclusive.

The products of this invention are useful as intermediates in the synthesis of therapeutically active substances and as surface-active agents.

The amines are high-boiling liquids, soluble in most polar organic liquids and only slightly soluble in water. The compounds are basic substances which form stable salts with mineral acids such as hydrochloric, hydrobromic, and sulfuric; organic carboxylic acids such as acetic, propionic, citric, and tartaric; and strong phenolic acids such as picric acid. These amines, having two basic amino nitrogen atoms, are capable of forming salts with one or two equivalents of acid, the salt obtained being dependent upon the quantity of acid used in its formation.

The compounds of the present invention may be prepared by the reaction of a 1-alkyl-4-piperidone with β-aminoethanol followed by reduction of the reaction product. Preferably, the condensation and reduction are carried out without the isolation of any intermediate product. The condensation is sufficiently rapid at room temperature so that heating of the reaction is not necessary; mere mixing will suffice. The reduction is preferably carried out with hydrogen under pressure in the presence of a hydrogenation catalyst such as platinum oxide, Raney nickel, or palladium. The conditions of the reduction, such as temperature and pressure, are not critical. The reductive alkylation may be carried out, for example, at room temperature and a hydrogen pressure of about 50 pounds per square inch. Higher temperatures and pressures, while operative, are not essential. A diluent, inert to the reactants and products of the reaction, such as alcohols and hydrocarbons, may be used, if desired, but the preferred embodiment of the process does not contemplate such use.

The products of the reaction may be isolated in ways known to the art. A satisfactory procedure is the removal of the catalyst by filtration followed by fractional distillation.

Salts of the amine are prepared by mixing a solution of the amine with a stoichiometric quantity of the selected acid followed by evaporation of the solution to dryness. Other methods of preparing amine salts known to the art may also be used.

The following examples are illustrative of the invention but are not to be construed as limiting.

*Example 1.—1-ethyl-4-(β-hydroxyethylamino)-piperidine*

Eleven and three-tenths grams of β-aminoethanol and 23.5 grams of 1-ethyl-4-piperidone [J. Am. Chem. Soc. 68, 1239 (1946)] were mixed at room temperature. One hundred milliliters of absolute alcohol was then added and the solution hydrogenated in a suitable apparatus at room temperature and an initial hydrogen pressure of 50 pounds per square inch using a platinum oxide catalyst. After absorption of hydrogen had ceased, the catalyst was removed by filtration and the filtrate fractionally distilled. There was thus obtained 15.8 grams of 1-ethyl-4-(β-hydroxyethylamino)-piperidine, boiling at 117–119 degrees centigrade at a pressure of 17 millimeters of mercury.

*Example 2.—1-ethyl-4-(β-hydroxyethylamino)-piperidine dipicrate*

The dipicrate of the compound of Example 1 was prepared according to the procedure given previously. This dipicrate melted with decomposition at 217–219 degrees centigrade.

*Example 3.—1-methyl-4-(β-hydroxyethylamino)-piperidine and salts thereof*

In the same manner as given in Example 1, equimolar quantities of 1-methyl-4-piperidone and β-aminoethanol are mixed at room temperature, absolute alcohol added, and hydrogenation accomplished with a hydrogen pressure of about 50 pounds per square inch and a platinum oxide catalyst. After removal of catalyst and fractional distillation 1-methyl-4-(β-hydroxyethylamino)-piperidine, a high-boiling viscous liquid, is obtained. The dipicrate and dihydrochloride thereof are obtained by mixing the selected acid with the free base and evaporating to dryness.

Additional compounds within the scope of the invention which may be prepared in the given manner include 1-propyl-, 1-isopropyl-, 1-butyl-, 1-isobutyl-, 1-amyl-, other lower-alkyl-4-(β-hydroxyethylamino)-piperidines, and salts thereof.

Various modifications may be made in the present invention without departing from the spirit or scope thereof, and it is to be understood as limited only as defined by the appended claims.

I claim:

1. A compound of the group consisting of 1-lower-alkyl-4-(β-hydroxyethylamino)-piperidines, wherein the lower-alkyl group contains from one to eight carbon atoms, inclusive, and acid salts thereof.

2. 1-ethyl-4-(β-hydroxyethylamino)-piperidine.

3. 1-ethyl-4-(β-hydroxyethylamino)-piperidine dipicrate.

4. The method for the production of a 1-alkyl-4-(β-hydroxyethylamino)-piperidine which includes the step of hydrogenating, under a pressure of hydrogen and in the presence of a hydrogenation catalyst, a 1-alkyl-4-(β-hydroxyethylimino)-piperidine, to produce a 1-alkyl-4-(β-hydroxyethylamino)-piperidine.

ROBERT H. REITSEMA.

REFERENCES CITED

The following references are of record in the file of this patent:

UNITED STATES PATENTS

| Number | Name | Date |
|---|---|---|
| 2,422,013 | Haury et al. | June 10, 1947 |

FOREIGN PATENTS

| Number | Country | Date |
|---|---|---|
| 365,214 | Great Britain | Jan. 21, 1932 |

OTHER REFERENCES

Cerkovnikov: Chem. Abstracts, vol. 37 (1943) pp. 125–127.